(12) United States Patent
Francillon et al.

(10) Patent No.: US 8,935,527 B2
(45) Date of Patent: Jan. 13, 2015

(54) SECURE TRANSMISSION WITH ERROR CORRECTING CODE

(75) Inventors: Aurelien Francillon, Grenoble (FR); Vincent Roca, Domene (FR); Christoph Neumann, Grenoble (FR); Pascal Moniot, Bernin (FR)

(73) Assignee: STMicroelectronics SA, Montrouge (FR)

( * ) Notice: Subject to any disclaimer, the term of this patent is extended or adjusted under 35 U.S.C. 154(b) by 1845 days.

(21) Appl. No.: 12/086,899

(22) PCT Filed: Dec. 20, 2006

(86) PCT No.: PCT/FR2006/051403
§ 371 (c)(1),
(2), (4) Date: Apr. 19, 2010

(87) PCT Pub. No.: WO2007/074296
PCT Pub. Date: Jul. 5, 2007

(65) Prior Publication Data
US 2011/0035642 A1 Feb. 10, 2011

(30) Foreign Application Priority Data
Dec. 21, 2005 (FR) .................................. 05 13072

(51) Int. Cl.
| H04L 9/32 | (2006.01) |
| H03M 13/03 | (2006.01) |
| H03M 13/00 | (2006.01) |
| H04L 1/00 | (2006.01) |
| H04L 9/06 | (2006.01) |
| H04L 9/08 | (2006.01) |
| H03M 13/11 | (2006.01) |
| H03M 13/37 | (2006.01) |

(52) U.S. Cl.
CPC ............ H03M 13/03 (2013.01); H03M 13/033 (2013.01); H03M 13/63 (2013.01); H04L 1/0041 (2013.01); H04L 1/0057 (2013.01); H04L 9/06 (2013.01); H04L 9/08 (2013.01); H03M 13/1102 (2013.01); H03M 13/3761 (2013.01); H04L 2209/34 (2013.01)
USPC ........................................................ 713/168

(58) Field of Classification Search
USPC ........................................ 713/168; 714/792
See application file for complete search history.

(56) References Cited

U.S. PATENT DOCUMENTS

| 5,526,370 A * | 6/1996 | McAuley ...................... 714/800 |
| 2004/0068687 A1* | 4/2004 | Kim et al. ..................... 714/755 |
| 2008/0169945 A1* | 7/2008 | Shokrollahi et al. ............ 341/51 |

OTHER PUBLICATIONS

John Byers et al., "Securing Bulk Content Almost for Free", Jan. 21, 2002, pp. 1-18.
J. Fernandez-Gonzalez et al., "Encryption and error correction codes for reliable file storage", Computer & Security, 12 (1993), pp. 501-510.

(Continued)

*Primary Examiner* — Esther Benoit
(74) *Attorney, Agent, or Firm* — Seed IP Law Group PLLC

(57) ABSTRACT

The invention concerns a method and a system for encoding digital data (DATA) represented by source symbols, with an error correcting code generating parity symbols from, for each parity symbol, a plurality of source symbols and at least one parity symbol of preceding rank, including at least encrypting once (54) at least one first value ($P_1$) into several encrypted values and integrating at least one combination ($P_{1,j}$) of said encrypted values to compute (55) at least one part ($P_2 \ldots P_{n-k}$) of said parity symbols.

29 Claims, 4 Drawing Sheets

(56) References Cited

OTHER PUBLICATIONS

Christoph Neumann et al., "Analysis of FEC Codes for Partially Reliable Media Broadcasting Schemes", Interactive Multimedia and Next Generation Networks, Second International Workshop on Multimedia Interactive Protocols and Systems, MIPS 2004, Proceedings Nov. 16-19, 2004, Grenoble, France, pp. 108-119.

International Search Report dated Jun. 13, 2007 in PCT Application No. PCT/FR2006/051403.

* cited by examiner

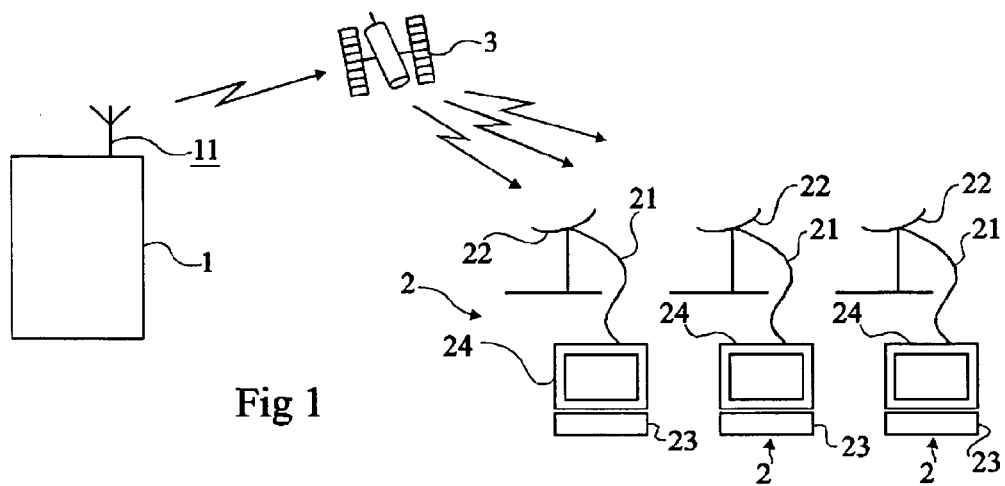
Fig 1
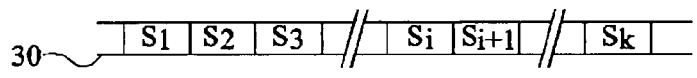
Fig 2A
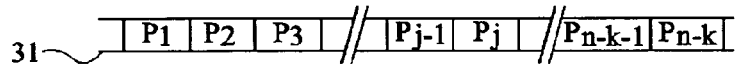
Fig 2B
Fig 2C
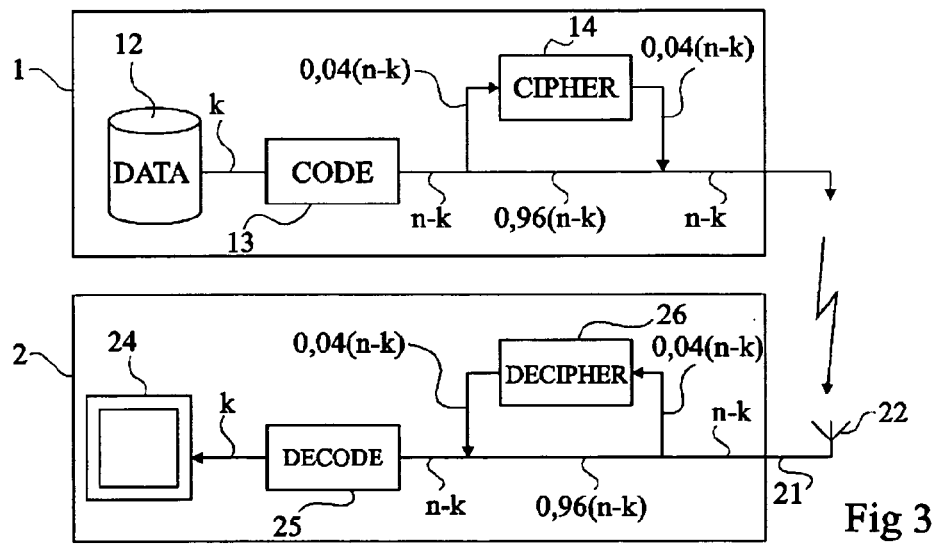
Fig 3

|   | E(S1) | S2 | E(S3) | S4 | E(S5) | E(S6) | S7 | S8 | E(S9) | S10 | P1 | P2 | P3 | P4 | P5 | P6 | P7 |
|---|---|---|---|---|---|---|---|---|---|---|---|---|---|---|---|---|---|
| L1 | 1 | 0 | 0 | 0 | 0 | 1 | 0 | 0 | 1 | 0 | 1 | | | | | | |
| L2 | 0 | 0 | 1 | 0 | 1 | 0 | 0 | 0 | 0 | 0 | 1 | 1 | | | | | |
| L3 | 0 | 1 | 1 | 0 | 0 | 1 | 1 | 0 | 1 | 1 | | 1 | 1 | | | | |
| L4 | 1 | 0 | 0 | 1 | 0 | 0 | 0 | 1 | 0 | 0 | | | 1 | 1 | | | |
| L5 | 0 | 1 | 0 | 1 | 0 | 0 | 1 | 0 | 0 | 0 | | | | 1 | 1 | | |
| L6 | 0 | 0 | 1 | 0 | 1 | 0 | 0 | 1 | 1 | 0 | | | | | 1 | 1 | |
| L7 | 1 | 0 | 0 | 0 | 1 | 0 | 1 | 0 | 0 | 1 | | | | | | 1 | 1 |

31'

|   | E(S1) | S2 | E(S3) | S4 | E(S5) | E(S6) | S7 | S8 | E(S9) | S10 | S11 | E(S12) | P1 | P2 | P3 | P4 | P5 | P6 |
|---|---|---|---|---|---|---|---|---|---|---|---|---|---|---|---|---|---|---|
| L1 | 1 | 0 | 0 | 0 | 0 | 0 | 0 | 0 | 0 | 0 | 0 | 1 | 1 | | | | | |
| L2 | 0 | 0 | 0 | 0 | 1 | 0 | 0 | 1 | 0 | 0 | 0 | 0 | 1 | 1 | | | | |
| L3 | 0 | 0 | 1 | 0 | 0 | 1 | 1 | 0 | 0 | 1 | 0 | 0 | 0 | 1 | 1 | | | |
| L4 | 1 | 0 | 0 | 1 | 0 | 0 | 0 | 1 | 0 | 1 | 0 | 1 | 1 | 1 | 1 | 1 | | |
| L5 | 0 | 0 | 0 | 1 | 1 | 0 | 0 | 0 | 0 | 0 | 1 | 0 | 1 | 0 | 1 | 1 | 1 | |
| L6 | 0 | 0 | 1 | 0 | 0 | 0 | 0 | 1 | 0 | 0 | 1 | 0 | 1 | 0 | 0 | 1 | 1 | 1 |

31"

SECURE TRANSMISSION WITH ERROR CORRECTING CODE

CROSS-REFERENCE TO RELATED APPLICATION(S)

The present application is related to French Patent Application No. 0513072 filed Dec. 21, 2005, entitled "SECURE TRANSMISSION WITH ERROR CORRECTION CODE". French Patent Application No. 0513072 is assigned to the assignee of the present application and is hereby incorporated by reference into the present disclosure as if fully set forth herein. The present application hereby claims priority under 35 U.S.C. §119(a) to French Patent Application No. 0513072.

FIELD OF THE INVENTION

The present invention generally relates to digital data transmissions using error-correction codes. The present invention more specifically relates to transmissions in which the data are desired to be readable by an authorized receiver only. The present invention more specifically applies to one-way transmission systems, for example, broadcasting systems, that is, systems in which the receiver is not capable of communicating with the transmitter.

DISCUSSION OF THE RELATED ART

FIG. 1 is a schematic block diagram of an example of a data transmission system of the type to which the present invention applies. It is a broadcasting system (for example, DVB—Digital Video Broadcasting) in which a transmitter 1 encodes data to be transmitted to a great number of receivers 2. The number of receivers is generally not known. The transmission may be a radio transmission, with or without intervention of a relay satellite 3. Each receiver 2 comprises an antenna 22 communicating, for example, over wire connection 21, with a television set 24. The transmitter 1 communicates by means of a transmission antenna 11 with satellite 3 to broadcast programs and more generally any type of data. More generally, the communication support may be of any type (Internet network, for example).

The example of FIG. 1 is an example of a one-way system, in that the receivers are not able to transmit information towards the satellite back to the transmitter.

When limited access to certain programs is desired, it is necessary to include in television set 24, or to integrate thereto, a specific decoder 23 comprising keys enabling decoding of programs transmitted in ciphered manner.

Other systems to which the present invention also applies are mobile telephony type systems in which, although a bi-directional communication channel exists between the operator and the mobile phone, the telephones are likely to receive broadcast data at a large scale, the operator being used as a relay only. It is then difficult to consider having each receiver mobile phone communicate with the transmitter, the mobile phone behaving as a broadcast program receiver.

Most often, in digital data transmission systems, the data flow is combined by an error-correction code (FEC, for forward error-correction), for enabling data recovery in case of interference in the transmission. The need for error-correction codes is also linked to the absence of a bi-directional communication preventing the receiver from indicating to the transmitter that it has not properly received part of the data.

There exist codes operating on a symmetrical binary channel, thus called because a bit can be received with no error or be inverted. The error-correction code then checks the coherence of the bits received over the channel. Such error-correction codes are generally integrated to the physical layer.

There also exist error-correction codes which operate on a symbol deletion channel, the symbols representing one or several bits or bytes. This channel is called this way because a symbol can either be received with no error, or destroyed by the channel. The symbol is the unit (byte or bit sequence) of processing by the system and its size is fixed. Such error-correction codes are generally used above the physical layer.

The present invention applies to the processing of error-correction codes at the level of the symbols, which most often have a size of several hundreds or several thousands of bytes or bits.

Such a coding generates an increase in the volume of data to be transmitted. A code rate is generally defined as being the number (k) of source symbols of the object to be transmitted (file, data flow, etc.) divided by a total number (n) of symbols. The n symbols are formed of the k source symbols and of the n–k parity symbols. Ratio k/n is smaller than or equal to one, and generally range between 2/3 and 1.

FIGS. 2A, 2B, and 2C very schematically illustrate an example of an error-correction coding of the type to which the present invention more specifically applies. It is a so-called LDPC (low density parity check) technique which exploits a parity matrix formed of a portion (or sub-matrix) of source symbols and of a portion (or sub-matrix) of parity symbols. The interpretation of such a matrix provides the transmitted parity symbols in addition to the source symbols.

FIG. 2A arbitrarily shows a flow 30 of source symbols $S_1$, $S_2 \ldots, S_i, S_{i+1} \ldots, S_k$. FIG. 2B illustrates an example of a parity matrix 31 in which each of the first k columns (sub-matrix of source symbols) is assigned to one of symbols $S_i$ (i ranging between 1 and k) and each of the last n–k columns (sub-matrix of parity symbols) is assigned to one of parity symbols $P_j$ (j ranging between 1 and n–k). The parity matrix comprises n–k lines $L_1$, $L_2$, etc. respectively assigned to the parity symbols to be calculated (and to be transmitted). Each element of the first matrix portion represents the taking into account (1) or not (0 or nothing) of the symbol of the corresponding column in the calculation of the symbol of the current line. The construction of the parity matrix is in this example said to be an LDPC staircase construction. It may be comprised of several thousands of columns and several thousands of lines.

To read matrix 31, it must be considered that the XOR-type combination ($\oplus$) of the source or parity symbols identified in each line must be zero. For example, for the third line, $S_2 \oplus \ldots S_i \oplus \ldots \oplus P_2 \oplus P_3 = 0$.

On the receive side, knowing the parity matrix, it is possible to perform the operations of recovery of the transmitted source symbols.

The forming of the sub-matrix of source symbols depends on the application. It may use a pseudo-random generation.

A first solution to cipher a data flow would be to submit all the symbols upstream or downstream of the coding to a ciphering algorithm (AES, DES, RC4, etc.). A disadvantage of such a solution is the processing time, be it on the transmit or receive side.

Indeed, error-correction codes and ciphering algorithms have in common to have to process data integrally and to be expensive tasks in terms of access and/or memory consumption, as well as in terms of time of processing by a central processing unit, and thus of power.

They however pursue other opposite goals, especially the fact that an error-correction code aims at easing the data recovery while the ciphering conversely aims at making the data recovery difficult for a receiver that does not have the right key.

A problem which is posed to add a data-ciphering function to an error-correction code is that this generates a processing time which adds to the coding time. This problem is particularly acute on the receiver side, where processing capacities must be optimized.

FIG. 3 is a block diagram illustrating a known method for ciphering data to be broadcast with an error-correction function. This method is described in article "Securing Bulk Content Almost for Free" by J. Byers et al., accepted in Computer Communication Journal in January 2005, to be published in "Computer Communication Journal, Special Issue on Network Security".

On the side of transmitter 1, data DATA (block 12) to be transmitted are submitted to an FEC-type coding (block 13, CODE). The coding output provides a number of symbols greater than the number of input symbols. Then, 4% of the coded symbols (0.04(n–k)) are submitted to a ciphering (block 14, CIPHER) before transmission while the remaining 96% (0.96(n–k)) are transmitted directly. The coding may be of so-called Tornado type but it may also be of LDPC type or of another type. The transmitter of course comprises transmission elements (not shown) for, for example, a radio broadcasting.

On the side of receiver 2, the flow of n–k symbols received from antenna 22 is, after demodulation and other receive processings (level matching, filtering, etc.), partly submitted (4%) to a deciphering (block 26, DECIPHER) before being entirely submitted to the decoding (block 25, DECODE), where 96% of the symbols need not be deciphered. The output of block 25 provides the flow of k decoded data symbols to be transmitted, for example to a television set 24.

As a variation of the ciphering, a secure channel may also be used to transmit the 4% of the symbols intended to condition the proper obtaining of the data on the receiver side.

A disadvantage of the solution of FIG. 3 is that it is not secure enough (not resistant enough to crypto-analysis). Indeed, attacks on the 96% of the symbols not submitted to the ciphering may enable restoring the plain symbols. For example, by means of statistical analyses on the parity symbols which most often correspond to an XOR-type combination of source symbols, it is possible to recover the transmitted data. In particular, if the source data are formed of a significant number of null data (byte=00), the data are transmitted almost plainly. Further, in the case of a text file, a lexical analysis quite easily enables recovering portions of the original content. Further, if a same file is transmitted twice with a low number of difference bits, the obtained output flow is almost identical, which also is a weakness. For the ciphering to be efficient, the input flow would have to be perfectly random, which in practice is never the case.

SUMMARY OF THE INVENTION

The present invention aims at overcoming all or part of the disadvantages of known solutions combining an error-correction code processing with a ciphering for a digital data transmission.

The present invention more specifically aims at providing a solution improving the resistance to crypto-analysis of the transmitted data, without for all this returning to a solution requiring the ciphering of all the data.

The present invention also aims at providing a solution which is particularly well adapted to large-scale broadcasting systems.

The present invention also aims at providing a solution compatible with any ciphering algorithm.

The present invention also aims at providing a solution which is particularly well adapted to the use of LDPC-type error-correction codes.

The present invention also aims at providing a solution compatible with the creation of groups and sub-groups of users.

To achieve all or part of these objects as well as others, the present invention provides a method for coding digital data represented by source symbols, with an error-correction code for generating parity symbols based on, for each parity symbol, several source symbols and at least one parity symbol of preceding rank, comprising at least steps of:

ciphering at least a first value into several ciphered values; and taking into account at least one combination of said ciphered values to calculate at least part of the parity symbols.

According to an embodiment of the present invention, said first value depends on at least part of the source symbols.

According to an embodiment of the present invention, said first value comprises a combination of all the source symbols.

According to an embodiment of the present invention, said first value is the first parity symbol, a combination being assigned to each parity symbol from the second one.

According to an embodiment of the present invention, said first value is independent from the source symbols, a combination being assigned to each parity symbol.

According to an embodiment of the present invention, each so-called parity symbol takes into account a combination different from those assigned to the other parity symbols.

According to an embodiment of the present invention, each ciphered value corresponds to a ciphering of said first value with a different initialization vector.

According to an embodiment of the present invention, said first value is submitted to a ciphering with a first key for transmission, said ciphered value(s) being obtained by ciphering of said first value with a second key, preferably different from the first one.

The present invention also provides a method for decoding received data, comprising at least steps of:

deciphering said first value by means of said first key;

restoring said combinations from said ciphered values obtained by ciphering said first value by means of the second key; and submitting the received parity symbols to a decoding by the error-correction code.

According to an embodiment of the present invention, the source symbols of a partial assembly, preferably comprising less than 1% of the total number of source symbols, are ciphered and transmitted with no coding.

According to an embodiment of the present invention, said first key is used to cipher said source symbols of the partial assembly.

According to an embodiment of the present invention, the error-correction code is represented by a matrix in which each line represents an equation for obtaining a parity symbol, each column of a first portion representing a source symbol and each column of a second portion representing a parity symbol, at least one column of the second portion containing, for all or part of the lines, one of said combinations.

According to an embodiment of the present invention, a ciphering matrix conditions each combination of several ciphered values.

The present invention also provides a coded data transmission method in which said matrixes, or seeds enabling generation thereof by receivers, are transmitted before the parity symbols.

According to an embodiment of the present invention, the ciphering key(s) are a function of groups of receivers for which the data are intended.

The present invention also provides a transmitter of digital data in an error-correction code transmission system.

The present invention also provides a receiver of digital data transmitted by an error-correction code system.

The present invention also provides a system for transmitting digital data by application of an error-correction code.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 1, previously described, is a schematic block diagram of an example of a broadcasting system of the type to which the present invention applies;

FIGS. 2A, 2B, and 2C, previously described, illustrate an LDPC-type error-correction code coding mechanism;

FIG. 3, previously described, is a schematic block diagram illustrating a known technique combining a ciphering and an error-correction code;

DETAILED DESCRIPTION

Figures 4, 5, 6:
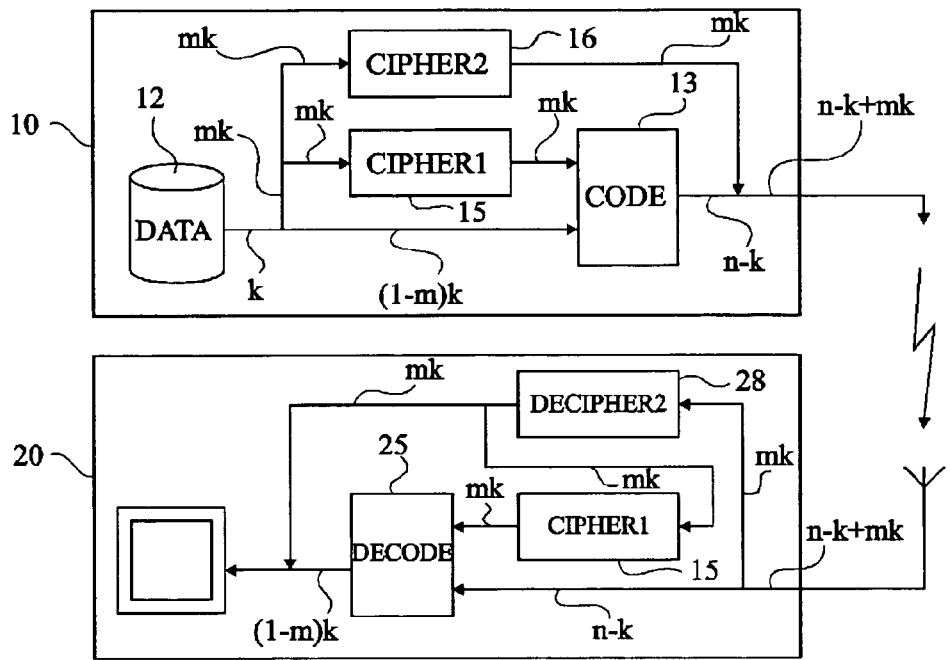
FIG. 4 is a schematic block diagram illustrating an example of a ciphering and coding system according to an embodiment of a first aspect of the present invention.
FIG. 5 illustrates, with an example of parity matrix, a first embodiment of the present invention according to its first aspect.
FIG. 6 illustrates, with an example of parity matrix, a second embodiment of the present invention according to its first aspect.

The same elements have been designated with the same reference numerals in the different drawings. Further, for clarity, only those steps and elements which are useful to the understanding of the present invention have been shown in the drawings and will be described hereafter. In particular, the actual means of transmission, especially of modulation and demodulation, have not been detailed, the present invention being compatible with any conventional system. Further, the ciphering algorithms usable by the present invention have not been detailed either, the present invention being here again compatible with any conventional symmetrical algorithm.

According to a first aspect, the present invention provides selecting part of the source symbols to be submitted to a ciphering, then applying the coding to all symbols, be they or not ciphered.

FIG. 4 is a simplified block diagram of a system of ciphered transmission coded according to this first aspect of the present invention.

On the side of transmitter 10, data DATA (12) to be transmitted are partly submitted (mk source symbols with m<1) to a first ciphering algorithm (block 15, CIPHER1), to be submitted as ciphered with the rest (1−m)k of the source symbols (not ciphered) to the error-correction code (block 13, CODE). These mk source symbols are also transmitted, either ciphered by the first algorithm or, as shown, ciphered by a second algorithm (block 16, CIPHER2), without passing through the error-correction code. The second ciphering algorithm differs from the first one by the type of algorithm and/or by the used key. A significant difference with respect to the preceding solutions is that the mk source symbols are also taken into account by error-correction code 13. Code 13 provides n−k parity symbols to which add, for the transmission, the mk source symbols transmitted ciphered (without passing through the error-correction code).

On the side of receiver 20, in the flow of n−k(1−m) received symbols, the mk ciphered source symbols are deciphered by being submitted to the second algorithm (block 28, DECIPHER2). The mk plain source symbols are then ciphered by the first algorithm (block 15, CIPHER1) to be provided to the decoder (block 25, DECODE). The decoder provides the (1−m)k source symbols, the mk missing symbols being directly provided by the second algorithm. The k symbols are then exploited, for example, by a television set.

If the two ciphering algorithms are identical and use the same key, it is not necessary, on the receive side, to cipher back the mk symbols. They are then deciphered to be used directly and are submitted in parallel, such as received, to code 25 with the rest of the symbols. Such a variation is however less effective regarding the security of the transmitted data (resistance to crypto-analysis).

Proportion m of symbols submitted to the ciphering must remain low (for example, ranging between 0.1% and 10% and, preferably, between 0.1% and 1%) to avoid coming once again across the disadvantages of techniques comprising the steps of ciphering and coding of all symbols.

FIG. 5 illustrates, in a representation of a parity matrix 31', an embodiment of the present invention according to its first aspect.

A feature of this embodiment is to cipher (ciphering symbolized by a function E in FIG. 5), a reduced number of the first lines of source symbols present in parity matrix 31'. In this example, the data symbols $S_1$, $S_6$, $S_9$, $S_3$, and $S_5$ present in the first two lines ($L_1$ and $L_2$) of matrix 31' are ciphered before coding, while the other symbols which only appear in the subsequent lines are coded as they are. The application of the coding by using an LDPC staircase type parity matrix 31' results in that all parity symbols will contain ciphered data, which reduces the risk of crypto-analysis thereof. The parity symbol calculation is performed, as previously, by an XOR combination of the source (ciphered or not) and parity symbols of the line.

On the receive side, by receiving the n−k symbols $P_j$ (j taking the values from 1 to n−k), only one receiver possessing the ciphering key(s) will be able, by deciphering the mk source symbols transmitted as ciphered but not coded, and by then ciphering them again with the first algorithm, to restore a correct data symbol flow.

Such a technique can be envisaged due to the fact that the parity matrix takes into account, in subsequent symbols, the content of the preceding symbols.

FIG. 6 shows a parity matrix 31" according to a second embodiment of the first aspect of the present invention.

The source symbols to be ciphered (in this example, $S_1$, $S_5$, $S_8$, $S_{12}$) are selected so that each line of parity matrix 31″ contains, in its source symbol portion, at least one ciphered symbol.

An advantage is that this improves data confidentiality with respect to prior art solutions.

FIG. 6 also illustrates another modification with respect to the preceding embodiment, which is to use an LDPC parity matrix of triangle type, that is, in which each parity symbol from the third one $P_3$ is likely to combine more than two preceding parity symbols. Such a technique improves the security and the error-correction, that is, requires reception of a lesser number of symbols by a receiver so that it can successfully decode the original content.

Since the symbol matrixes can comprise several thousands of columns and several thousands of lines, the fact of only ciphering a small number of symbols is advantageous from the regarding processing time.

Figure 7A:
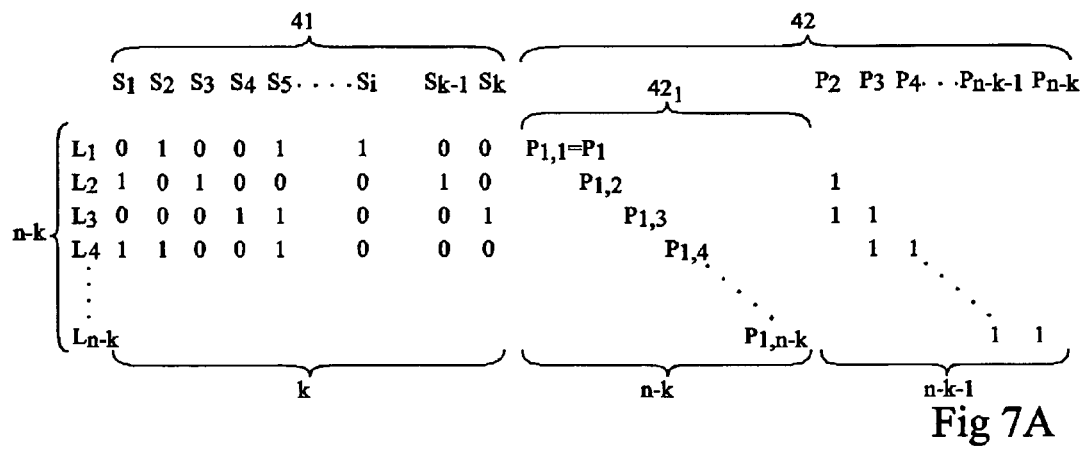
FIGS. 7A and 7B illustrate, in matrix representations, an embodiment of the present invention according to a second aspect.
Figure 7B:
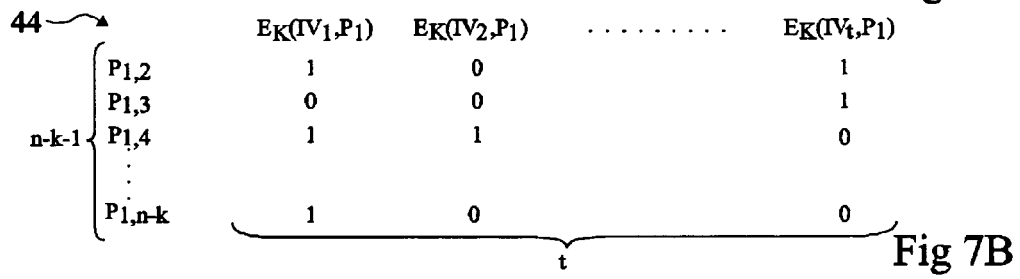

FIGS. 7A and 7B illustrate, in matrix representations, an embodiment of the present invention according to a second aspect.

A feature of this second aspect is to use, apart from the parity matrix having a parity symbol portion, for example, of LDPC staircase type, a second matrix of values ciphered to generate several combinations respectively taken into account in the parity symbol calculation. The ciphered values are, preferably, obtained by ciphering of one or several first parity symbols (number to be selected according to the system requirements to guarantee the information confidentiality). The combinations of ciphered values are then taken into account in the calculation of the parity symbols of higher ranks.

For example, the used sub-matrix of parity symbols is a matrix of staircase type in which a first column contains the results of different combinations of several ciphered variations of the first parity symbol which, in this case, is securely transmitted to the receiver. The combinations are, preferably, different for each matrix line. Accordingly, the contribution of the first parity symbol is different in each parity symbol of the next lines.

In the example of FIG. 7A, sub-matrix 41 of source symbols is established conventionally (FIG. 2B), with no ciphered symbol. Parity sub-matrix 42 is established by following a so-called staircase LDPC technique for all the parity symbols from the second one ($P_2$ to $P_{n-k}$). Further, all the lines from the second one, and thus all the calculated parity symbols from the second one, take into account a value $P_{1,j}$ which is a function of the first ciphered parity symbol $P_1$. This is illustrated by a sub-matrix 42₁ comprising, for each line from the second one, a value $P_{1,2}, P_{1,3} \ldots, P_{1,n-k}$. In this example, it is assumed that symbol $P_1$ is not ciphered ($P_{1,1}=P_1$).

FIG. 7B shows a ciphering matrix 44 arbitrarily illustrating in a matrix representation an example of generation of values $P_{1,2}, P_{1,3} \ldots, P_{1,n-k}$. Each value is obtained by combination of several variations $E_K(IV_1,P_1), E_K(IV_2,P_1) \ldots, E_K(IV_t,P_1)$ of the ciphering of parity symbol $P_1$ with a key K. Such variations are, for example, obtained by modifying an initialization vector IV of ciphering algorithm E. The ciphering algorithm is a symmetrical algorithm (for example, of DES or AES type used in CBC—Cipher Block Chaining—mode). Due to the combination of several variations ciphered to generate values $P_{1,j}$ number t of initialization vectors needs not be high (preferably ranging between 0.1% and 10% of the number of parity symbols). In this example, symbol $P_1$, preferably ciphered, must be received by the receiver so that it can restore the other symbols. Further, receiving it first improves decoding performances.

The combination of the different ciphered values in the creation of values $P_{1,j}$ is performed, for example, by means of an XOR operation. Other operations may also be used, for example, operations of rotation of the bits contained in the symbols. The combination operation is preferably selected according to the executed ciphering algorithm to avoid altering its performances in terms of resistance to crypto-analysis. Different types of operations may also be combined. In this case, ciphering matrix 44 contains the information (for example, through a word of two bits or more according to the number of operators) about the way in which ciphered variations $E_K(IV_1,P_1), E_K(IV_2,P_1) \ldots, E_K(IV_t,P_1)$ are combined in the obtaining of the combination $P_{1,j}$ assigned to each parity symbol $P_j$. For example, a 0 (00) in matrix 44 indicates that the variation is not taken into account, a 1 (01) indicates that the variation is taken into account by an XOR combination, a 2 (10) or a 3 (11) indicates a rotation by a fixed number (for example, 4 or 7) of bits of the current variation before XOR combination with the result of the combination of the preceding variations. In the simplified embodiment of FIG. 7B, a selection between two possibilities (0: variation of the column not taken into account; 1: taking into account of this variation by an XOR combination) is simply assumed.

Preferably, ciphering matrix 44 is periodically modified. For this purpose, it is sufficient to send the ciphering matrix generation seed and for the receiver to contain the software and/or hardware tools to reconstruct this matrix from the seed. This amounts to using, to transmit the ciphering matrix, the same technique as that used to transmit the parity matrix.

The embodiment of FIGS. 7A and 7B has, over the embodiment of FIG. 6, the advantage of being better for error-correction and, over the embodiment of FIG. 5, the advantage of being better in terms of resistance to crypto-analysis.

According to an alternative embodiment, symbol $P_1$ is constructed from all the source symbols (since sub-matrix 41 only comprises 1s in its first line). This improves the so-called "avalanche" effect in the other parity symbols and, accordingly, the ciphering, without adversely affecting the error-correction capacity.

According to another embodiment, first symbol $P_{1,1}$ itself originates from ciphering matrix 44 which combines ciphered values independent from the source symbols. In the representation of FIGS. 7A and 7B, this amounts to adding a line $P_{1,1}$ to matrix 44 and to taking into account, as a value to be ciphered, a quantity other than a combination $P_1$ of all or part of the source symbols. Matrix 42 also comprises one additional column to calculate first parity symbol $P_1$ according to the source symbols of the first line and to value $P_{1,1}$. There then is no further dependence between values $P_{1,j}$ and the source data.

Figure 8:
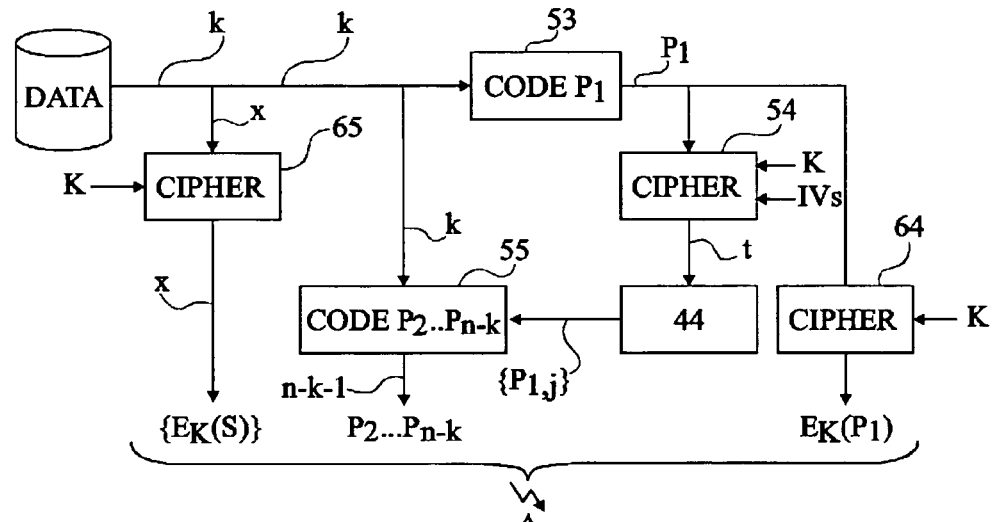
FIG. 8 is a schematic block diagram of an embodiment of a digital data transmission system according to the second aspect of the present invention.
Figure 8:
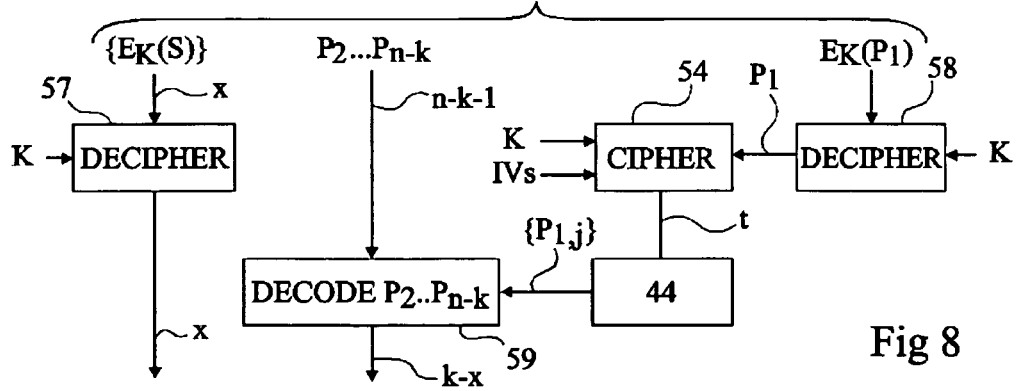

FIG. 8 is a schematic block diagram of an embodiment of a ciphering and coding system according to the second aspect of the present invention. The source symbols of the data (12) taken into account in the calculation of the first parity symbol are used to obtain said symbol (block 53, CODE P1). Symbol P1 is then ciphered (block 54, CIPHER) according to different initialization vectors $IV_s$ and to key K. The t obtained ciphered values are combined according to ciphering matrix 44 to obtain the respective values $P_{1,j}$ of the first parity symbol to be taken into account for the coding of the others (block 55, CODE $P_2 \ldots P_{n-k}$). All of the n−k parity symbols are then transmitted (broadcast). Preferably, a small number x (preferably between 0.1 and 1%) of the k source symbols which are ciphered with key K (block 65, CIPHER) is also selected. The x source symbols $E_K(S)$ ciphered with key K are transmitted in addition to the first parity symbol, preferably also ciphered $E_K(P_1)$ with this key K (block 64, CIPHER), and to the n–k–1 remaining parity symbols.

On the receive side, the first parity symbol is deciphered with key K (block 58, DECIPHER) as well as, if need be, the x source symbols $E_K(S)$ (block 57, DECIPHER). The first obtained parity symbol $P_1$ enables restoring values $E_K(IV_1, P_1)$, $E_K(IV_2, E_K(IV_r, P_1)$ ciphered with key K and thus restoring combinations $P_{i,j}$ (block 44) enabling decoding the n–k–1 remaining parity symbols $P_2, P_3 \ldots, P_{n-k}$ (block 59, DECODE $P_2, \ldots P_{n-k}$). The k–x remaining source symbols are then obtained.

The parity matrixes (sub-matrixes 41 and 42) and ciphering matrixes 44 must be transmitted (preferably at the beginning of a session and/or in secure fashion), as well as the ciphering initialization vectors (or a seed enabling restoring thereof) to enable all compatible receivers to restore the different matrixes. This restoring is however not sufficient to recover the source symbols. Only those symbols possessing key K will be able to decipher the first parity symbol to correctly decode the other symbols.

Figure 9:
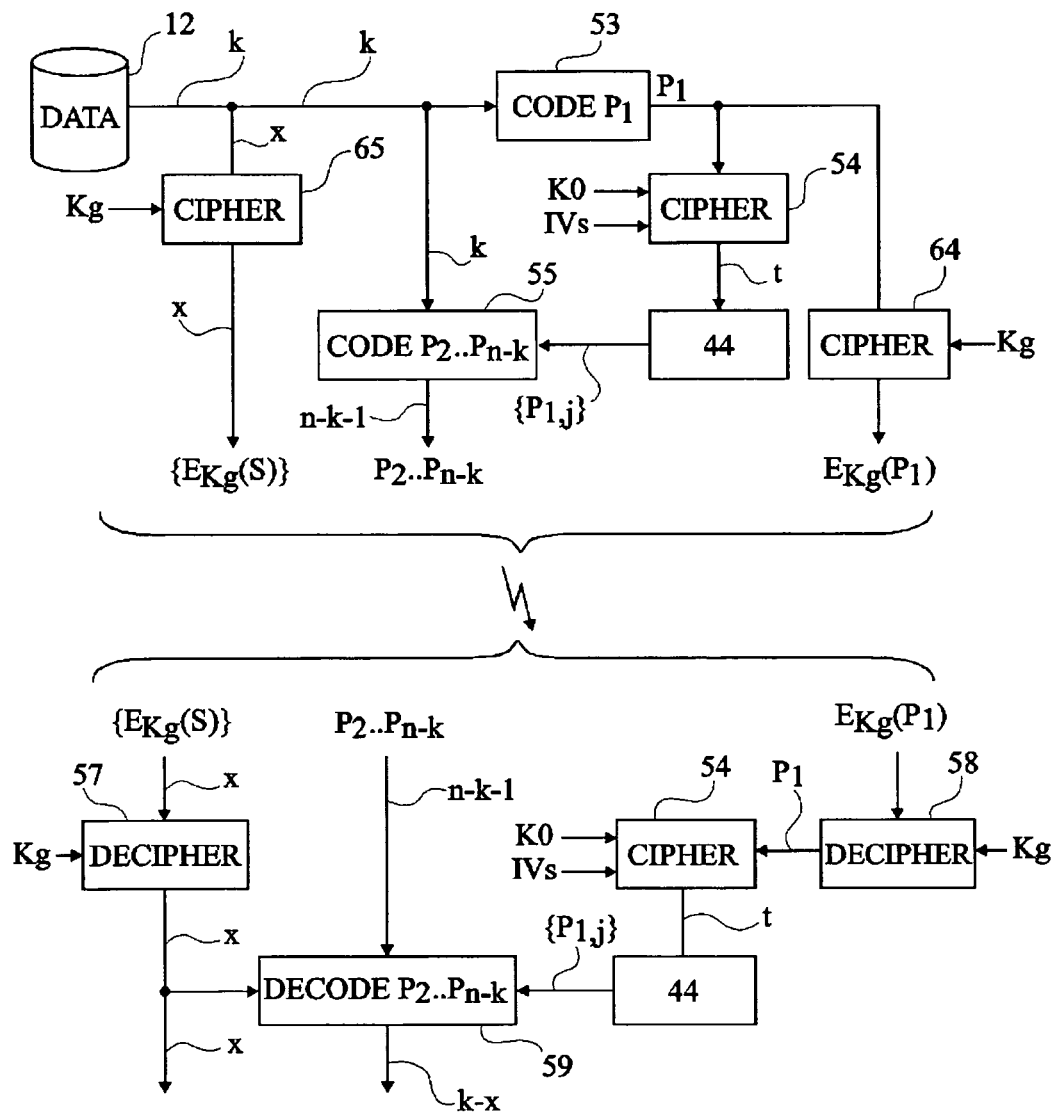
FIG. 9 is a schematic block diagram of another embodiment of a digital data transmission system according to the second aspect of the present invention.

FIG. 9 is a schematic block diagram of another embodiment of the second aspect of the present invention.

According to this embodiment, one key $K_g$ is assigned per user or per sub-group of users in addition to a key $K_0$ used for the ciphering of the parity symbols. As compared with the previous embodiment, the first transmitted parity symbol $P_1$ corresponds to a value $EK_g(P_1)$ ciphered with a key Kg (block 64, CIPHER) different from key $K_0$ used to obtain values $P_{1,j}$. The x ones of the k source symbols are ciphered with key Kg (block 65, CIPHER). The x source symbols $E_{Kg}(S)$ ciphered with key Kg are transmitted in addition to the first parity symbol ciphered with key Kg and to the n–k–1 parity symbols depending of the values ciphered with key $K_0$. In one case (not shown), the x source symbols are used in the ciphered version for the coding, which amounts to combining the two aspects of the present invention. Of course, the ciphering and parity matrixes (or seeds enabling generation thereof) are also transmitted, ciphered or not with key $K_0$. The same holds true for the initialization values generating the different values of the ciphering of the first parity symbol. According to a simplified variation, a single key Kg is used. This amounts to only providing a single group.

On the receive side, the x source symbols $E_{Kg}(S)$ are deciphered (block 57, DECIPHER) with key Kg, the same occurring for the first parity symbol (block 58, DECIPHER). The first obtained parity symbol $P_1$ enables restoring values $E_{K0}(IV_1, P_1), E_{K0}(IV_2, P_1) \ldots, E_{K0}(IV_r, P_1)$ ciphered with key $K_0$ and thus restoring combinations $P_{i,j}$ (block 44) enabling decoding, possibly using the x deciphered source symbols, the n–k–1 remaining parity symbols $P_2, P_3 \ldots, P_{n-k}$ (block 59, DECODE $P_2, \ldots P_{n-k}$). The k–x remaining source symbols are then obtained.

A receiver only possessing key $K_0$ is incapable of restoring the data. Similarly, a receiver only possessing key Kg is only capable of obtaining a very small part (less than 1%) of the source symbols.

This embodiment enables broadcasting data to sub-groups of users of a common group possessing key $K_0$.

An advantage is that the major part (more than 99%) of the transmitted content is the same for all receivers, a small part only of these symbols differing according to receivers, which simplifies calculations.

A restriction per groups of users such as discussed in relation with FIG. 9 may also be implemented with the first aspect of the present invention. For example, a common key is used by the second ciphering algorithm (15, FIG. 4) while group keys are used for the first algorithm (block 14 and 26).

An advantage of the present invention is that it improves the security of the transmitted data.

Another advantage of the present invention according to its second aspect is that it is compatible with the management of different groups of users.

Of course, the present invention is likely to have various alterations, modifications, and improvements which will readily occur to those skilled in the art. In particular, the practical implementation of the present invention based on conventional hardware and/or software tools (for example, by electronic circuits and/or microprocessors) is within the abilities of those skilled in the art based on the functional indications given hereabove. In particular, the forming of the symbol flow resulting from the coding and ciphering of the present invention with, if need be, receiver parameterizing symbols (for example, indicating the applied ciphering type) is not a problem. Further, the present invention applies to different types of ciphering algorithms, the selection of which is to be made by those skilled in the art according to the application. Further, in the embodiments where source symbols are transmitted with no coding, the number of these symbols (between 0.1 and 1% of the source symbols) is to be selected by making a compromise between the calculation required on the receiver side and security (resistance to crypto-analysis).

The invention claimed is:

1. A method of encoding data, comprising:
    ciphering, by a transmitter, mk of k source symbols using a first ciphering algorithm to generate a first set of mk enciphered symbols, where m<1;
    generating, by the transmitter, n–k parity bits using low density parity check coding based upon the first set of mk enciphered symbols and a remaining (1–m)k of the k source symbols without enciphering the (1–m)k remaining source symbols; and
    transmitting, by the transmitter, the n–k parity bits and mk enciphered symbols.

2. The method of claim 1, wherein the mk enciphered symbols that are transmitted are the first set of mk enciphered symbols.

3. The method of claim 1, further comprising:
    ciphering, by the transmitter, the mk source symbols using a second ciphering algorithm to generate a second set of mk enciphered symbols, wherein the mk enciphered symbols that are transmitted are the second set of mk enciphered symbols.

4. The method of claim 1, wherein the n–k parity bits are generated using the first set of mk enciphered symbols and the unenciphered (1–m)k remaining source symbols as rows in a low density parity check (LDPC) matrix.

5. The method of claim 4, wherein the first set of mk enciphered symbols and the unenciphered (1–m)k remaining source symbols form two rows in the LDPC matrix, and wherein the n–k parity bits comprise a pair of parity bits generated using the two rows.

6. The method of claim 5, further comprising:
    generating two parity bits for each row other than a first row in the LDPC matrix.

7. The method of claim 6, wherein the n–k parity bits of the first row in the LDPC matrix comprises one first parity bit generated using a combination of the k source symbols.

8. The method of claim 6, wherein the n–k parity bits of the first row in the LDPC matrix comprises one first parity bit that is a combination of a plurality of source symbols, wherein the plurality of source symbols comprises less than all of the k source symbols.

9. A method of decoding received data, the method comprising:
- receiving transmitted data, the transmitted data comprising n−k parity bits and mk enciphered symbols, the transmitted data generated by ciphering mk of k source symbols using a first ciphering algorithm to generate a first set of mk enciphered symbols, where m<1, and by generating n−k parity bits using low density parity check coding based upon the first set of mk enciphered symbols and a remaining (1−m)k of the k source symbols without enciphering the (1−m)k remaining source symbols;
- deciphering, by a receiver, the mk enciphered symbols using a first key and a using a deciphering algorithm to generate a set of mk deciphered symbols;
- decoding the n−k parity bits based on the set of mk deciphered symbols to generate (1−m)k decoded data symbols; and
- outputting k received source symbols comprising the (1−m)k decoded data symbols and the set of mk deciphered symbols.

10. The method of claim 9, wherein the mk enciphered symbols of the transmitted data are the first set of mk enciphered symbols.

11. The method of claim 9, further comprising:
- ciphering, by the receiver, the set of mk deciphered symbols using the first ciphering algorithm to generate a set of mk re-enciphered symbols, wherein the set of mk deciphered symbols that the decoding is based on are the set of ink re-enciphered symbols.

12. The method of claim 9, wherein the mk enciphered symbols of the transmitted data are a second set of mk enciphered symbols generated by ciphering the mk source symbols using a second ciphering algorithm.

13. The method of claim 9, wherein the n−k parity bits are generated using the first set of mk enciphered symbols and the unenciphered (1−m)k remaining source symbols as rows in a low density parity check (LDPC) matrix.

14. The method of claim 13, wherein the first set of mk enciphered symbols and the unenciphered (1−m)k remaining source symbols form two rows in the LDPC matrix, and wherein the n−k parity bits comprise a pair of parity bits generated using the two rows.

15. The method of claim 14, wherein the transmitted data is generated by generating two parity bits for each row other than a first row in the LDPC matrix.

16. The method of claim 15, wherein the n−k parity bits of the first row in the LDPC matrix comprises one first parity bit generated using a combination of the k source symbols.

17. The method of claim 15, wherein the n−k parity bits of the first row in the LDPC matrix comprises one first parity bit that is a combination of a plurality of source symbols, wherein the plurality of source symbols comprises less than all of the k source symbols.

18. The method of claim 9, wherein the ciphering comprising employing at least one of:
- Data Encryption Standard (DES),
- Advanced Encryption Standard (AES),
- Rivest Cipher 4 (RC4), and
- a symmetrical ciphering algorithm used in a Cipher Block Chaining (CBC) mode.

19. The method of claim 9, wherein the m is at least 0.1% and less than 1%.

20. A device, comprising:
- processing circuitry, which in operation,
  - ciphers mk of k source symbols using a first ciphering algorithm to generate a first set of mk enciphered symbols, where m<1; and
  - generates n−k parity bits using low density parity check coding based upon the first set of mk enciphered symbols and a remaining (1−m)k of the k source symbols without enciphering the (1−m)k remaining source symbols; and
- a transmitter, which in operation, transmits the n−k parity bits and mk enciphered symbols.

21. The device of claim 20 wherein the processing circuitry generates the n−k parity bits using the first set of mk enciphered symbols and the unenciphered (1−m)k remaining source symbols as rows in a low density parity check (LDPC) matrix.

22. The device of claim 21 wherein the first set of mk enciphered symbols and the unenciphered (1−m)k remaining source symbols form two rows in the LDPC matrix, and wherein the n−k parity bits comprise a pair of parity bits generated using the two rows.

23. A receiver, comprising:
- an input, which in operation receives transmitted data, the transmitted data comprising n−k parity bits and mk enciphered symbols, the transmitted data generated by ciphering mk of k source symbols using a first ciphering algorithm to generate a first set of mk enciphered symbols, where m<1, and by generating n−k parity bits using low density parity check coding based upon the first set of mk enciphered symbols and a remaining (1−m)k of the k source symbols without enciphering the (1−m)k remaining source symbols; and
- processing circuitry, which, in operation,
  - deciphers the mk enciphered symbols using a first key and a using a deciphering algorithm to generate a set of mk deciphered symbols;
  - decodes the n−k parity bits based on the set of mk deciphered symbols to generate (1−m)k decoded data symbols; and
  - outputs k received source symbols comprising the (1−m)k decoded data symbols and the set of mk deciphered symbols.

24. The receiver of claim 23 wherein the n−k parity bits are generated using the first set of mk enciphered symbols and the unenciphered (1−m)k remaining source symbols as rows in a low density parity check (LDPC) matrix.

25. The receiver of claim 24 wherein the first set of mk enciphered symbols and the unenciphered (1−m)k remaining source symbols form two rows in the LDPC matrix, and wherein the n−k parity bits comprise a pair of parity bits generated using the two rows.

26. A non-transitory computer-readable medium whose contents cause a receiver to perform a method, the method comprising:
- receiving transmitted data, the transmitted data comprising n−k parity bits and mk enciphered symbols, the transmitted data generated by ciphering mk of k source symbols using a first ciphering algorithm to generate a first set of mk enciphered symbols, where m<1, and by generating n−k parity bits using low density parity check coding based upon the first set of mk enciphered symbols and a remaining (1−m)k of the k source symbols without enciphering the (1−m)k remaining source symbols;

deciphering the mk enciphered symbols using a first key and a using a deciphering algorithm to generate a set of mk deciphered symbols;

decoding the n−k parity bits based on the set of mk deciphered symbols to generate (1−m)k decoded data symbols; and outputting k received source symbols comprising the (1−m)k decoded data symbols and the set of mk deciphered symbols.

27. The medium of claim 26 wherein the n−k parity bits are generated using the first set of mk enciphered symbols and the unenciphered (1−m)k remaining source symbols as rows in a low density parity check (LDPC) matrix.

28. The medium of claim 27 wherein the first set of mk enciphered symbols and the unenciphered (1−m)k remaining source symbols form two rows in the LDPC matrix, and wherein the n−k parity bits comprise a pair of parity bits generated using the two rows.

29. The medium of claim 28 wherein the transmitted data is generated by generating two parity bits for each row other than a first row in the LDPC matrix.

* * * * *

UNITED STATES PATENT AND TRADEMARK OFFICE
CERTIFICATE OF CORRECTION

PATENT NO.       : 8,935,527 B2
APPLICATION NO.  : 12/086899
DATED            : January 13, 2015
INVENTOR(S)      : Aurelien Francillon et al.

It is certified that error appears in the above-identified patent and that said Letters Patent is hereby corrected as shown below:

In the claims

Column 11, Line 34, Claim 11:
"set of ink re-enciphered symbols." should read, --set of mk re-enciphered symbols.--.

Signed and Sealed this
Eighth Day of December, 2015

Michelle K. Lee
*Director of the United States Patent and Trademark Office*